R. R. GUBBINS.
Motive-Powers.

No. 151,117.

2 Sheets--Sheet 1.

Patented May 19, 1874.

R. R. GUBBINS.
Motive-Powers.

No. 151,117.

2 Sheets--Sheet 2.

Patented May 19, 1874.

UNITED STATES PATENT OFFICE.

RICHARD R. GUBBINS, OF TROY, NEW YORK.

IMPROVEMENT IN MOTIVE-POWERS.

Specification forming part of Letters Patent No. 151,117, dated May 19, 1874; application filed May 1, 1874.

*To all whom it may concern:*

Be it known that I, RICHARD R. GUBBINS, of Troy, in the county of Rensselaer and State of New York, have invented a certain new and useful Mechanical Movement; and I do hereby declare the following to be a full, clear, and exact description of the invention, such as will enable others skilled in the art to which it pertains to make and use it, reference being had to the accompanying drawings, which form part of this specification, in which—

Figure 1:
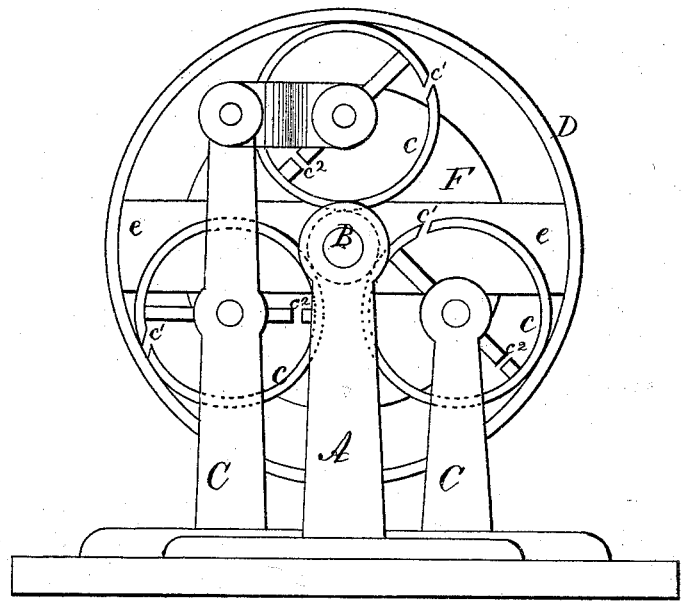
Figure 2:
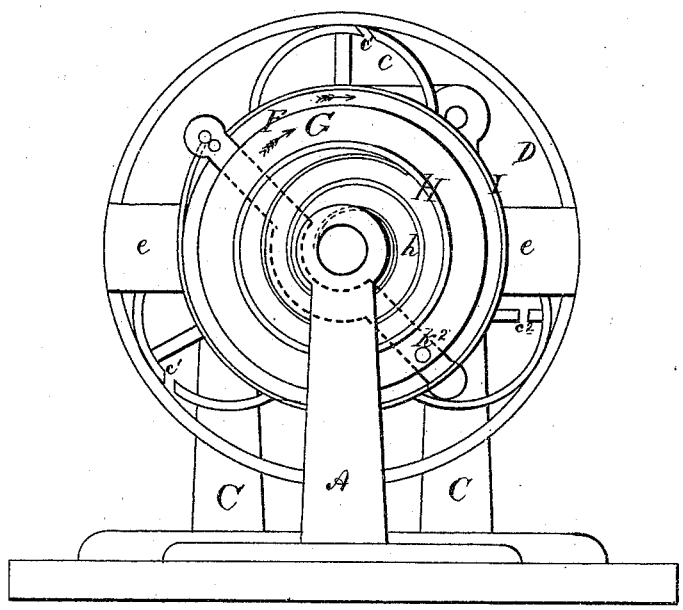
Figure 3:
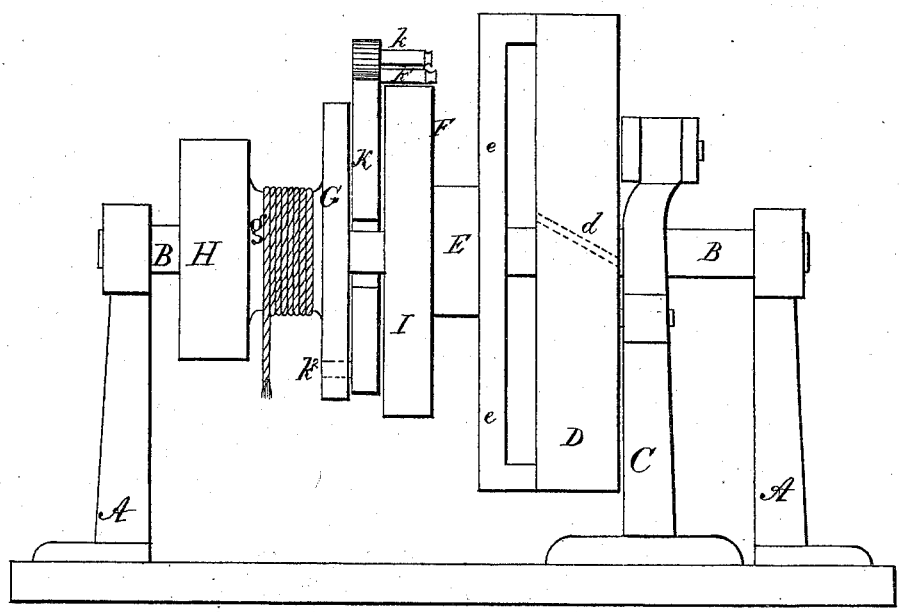

Figures 1 and 2 are end elevations. Fig. 3 is a side elevation.

My invention has for its object to produce an effective mechanical movement, whereby a slow reciprocating motion may be converted into or made to produce a very rapid and uniform rotation of a shaft. The nature of my invention consists in the peculiar and novel construction and combination of parts, as hereinafter fully set forth.

Referring to the accompanying drawings, A A represent standards or arbors affording bearings for a shaft, B. C C are other standards, in which are journaled the shafts of friction-rollers $c$ $c$ $c$, whose peripheries impinge upon and move in contact with the inner surface of the band-wheel D, which is sustained by the radial arms $e$ $e$ on the hub E, which turns loosely on the shaft B. F represents a disk, forming a part of or made fast to the hub E. When the disk F is turned the wheel D moves therewith, imparting motion in the opposite direction to the friction-rollers $c$ $c$ $c$, rotating also the shaft B. In order that the rollers $c$ $c$ $c$ may always bind sufficiently upon the shaft B and wheel D, said rollers are cleft, as shown at $c^1$, and if provided with two arms, as shown, one of these should be cut through, as shown at $c^2$. I prefer, however, to have but one radial arm for each of the rollers $c$ $c$ $c$. Instead of making the rollers cleft the band or wheel D may be cut in a similar manner, as shown in a dotted line at $d$, one of its radial arms—when more than one is employed—being severed similar to the arms of the rollers. If deemed advisable both the rollers $c$ $c$ $c$ and band or wheel D may be cleft; but this I deem unnecessary, the described severance of either being sufficient to produce the requisite elasticity for friction and to keep up compensation for wear. G represents a disk upon the hub $g$, to which is also secured the drum H, containing the coiled spring $h$, one end of which is secured to the shaft A, the other being made fast to the flange $h'$ of said drum. The disk G, hub $g$, and spring-drum H are connected and made to revolve with the shaft B, hub E, and band-wheel D by the means I shall now proceed to describe. I represents a thin steel band surrounding the disk F, its two ends being connected, as shown, to the studs or pins $k$ $k^1$, on the arm K, whose other end is provided with a pin, $k^2$, that enters a corresponding hole in the disk G. When said disk G moves in the direction of the arrow, which is the direction it will be impelled to move by the uncoiling of the spring $h$, the band I will slide loosely upon the disk F, but when said disk G is moved in the contrary direction, which it will be when the spring $h$ is being coiled, said band will bind tightly upon said disk F, moving it and the band-wheel D, and imparting the desired motion to the rollers $c$ $c$ $c$ and shaft A.

The operation, then, is briefly as follows: A cord is made fast by one end to and wound around the hub $g$. By drawing upon this cord the disks F and G and band-wheel D are made to rotate, revolving also the rollers $c$ $c$ $c$ and shaft B. By relaxing the pull upon the cord it will then be wound again upon the hub $g$ by the recoil of the spring $h$, when the operation will be repeated as before. The shaft B should be provided with a heavy fly-wheel, which will acquire a sufficient momentum to keep up the rotation of said shaft while the spring $h$ is recoiling. If desired the rollers $c$ $c$ $c$ and the inside of the rim of the band-wheel D may be provided with cogs, occupying a part—say, one-third—of the face of the inside and outside gears, the pitch-lines of such cogs corresponding with the surface of the respective inside and outside wheels. The effect of this will be to render the rotation of the friction-wheels positive.

What I claim as my invention is—

1. In combination with the band-wheel D and shaft B the cleft rollers $c\ c\ c$, substantially as shown and described.

2. In combination with the disks F and G, the spring-drum H, band I and arm K, the several parts being constructed and combined for operation substantially as shown and described.

In testimony that I claim the foregoing I have hereunto set my hand this 28th day of April, 1874.

RICHARD R. GUBBINS.

Witnesses:
  GEO. C. SHELMERDINE,
  C. DAN'L CONNOLLY.